United States Patent
Fox et al.

(10) Patent No.: US 11,966,794 B2
(45) Date of Patent: Apr. 23, 2024

(54) LIGHTWEIGHT CONFIGURATION MANAGEMENT FOR APPLICATION PROGRAMMING INTERFACES

(71) Applicant: MASTERCARD TECHNOLOGIES CANADA ULC, Vancouver (CA)

(72) Inventors: Justine Celeste Fox, Pitt Meadows (CA); Brent Nemeth, Port Moody (CA); Sunita Khera, Delta (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 327 days.

(21) Appl. No.: 17/347,691

(22) Filed: Jun. 15, 2021

(65) Prior Publication Data
US 2022/0398139 A1    Dec. 15, 2022

(51) Int. Cl.
*G06F 9/54* (2006.01)
*G06F 9/445* (2018.01)

(52) U.S. Cl.
CPC .......... *G06F 9/541* (2013.01); *G06F 9/44505* (2013.01)

(58) Field of Classification Search
CPC ...... G06F 9/541; G06F 9/547; G06F 9/44505; G06F 8/36; G06F 8/71; G06Q 20/4016
See application file for complete search history.

(56) References Cited

U.S. PATENT DOCUMENTS

| | | | | |
|---|---|---|---|---|
| 2012/0110204 A1* | 5/2012 | Allen | .................. | H04L 69/32 709/232 |
| 2020/0220949 A1* | 7/2020 | Puniani | ................... | H04L 67/01 |
| 2020/0233789 A1* | 7/2020 | Battaglia | ............. | G06F 11/3688 |
| 2021/0073855 A1* | 3/2021 | Francia | ................... | G06N 20/00 |
| 2021/0208956 A1* | 7/2021 | Tatsumi | .................. | G06F 9/545 |
| 2021/0218758 A1* | 7/2021 | Jain | ......................... | G06F 9/545 |
| 2022/0345492 A1* | 10/2022 | Wu | ...................... | H04L 63/0853 |

FOREIGN PATENT DOCUMENTS

| | | |
|---|---|---|
| CN | 112905261 A | 6/2021 |
| WO | 2012075323 A1 | 6/2012 |

OTHER PUBLICATIONS

The Chromium Projects, "Tips for testing and debugging SameSite-by-default and SameSite=None; Secure cookies" (Mar. 18, 2021), pp. 1-9 [retrieved from https://www.chromium.org/updates/same-site/test-debug/]. (Year: 2021).*
International Search Report and Written Opinion for Related Application No. PCT/CA2022/050929 dated Aug. 31, 2022 (19 pages).

* cited by examiner

*Primary Examiner* — Brian W Wathen
(74) *Attorney, Agent, or Firm* — Michael Best & Friedrich LLP

(57) ABSTRACT

Methods and systems for providing configuration management using customized request headers. One system includes an electronic processor configured to receive, from a requesting device, a request including a customized request header, the customized request header including a custom configuration parameter. The electronic processor is also configured to perform a fraud analysis function based on the request. The electronic processor is also configured to generate a response including a customized response body based on the customized request header. The electronic processor is also configured to transmit the response to the requesting device, where the requesting device performs functionality based on information included in the customized response body.

20 Claims, 10 Drawing Sheets

```
{
  "ip": "1.2.3.4",
  "ua": "Mozilla/5.0 (Macintosh; Intel Mac OS X 10_14_6) AppleWebKit/537.36 (KHTML, like Gecko) Chrome/78.0.3904.87 Safari/537.36",
  "id": "bob",
  "status": "true"
}
```

*FIG. 6A*

```
{
  "riskLevel": 5,
  "risks": [
    "account harvesting",
    "account attack",
    "account testing",
    "account sharing",
    "login velocity"
  ]
}
```

*FIG. 6B*

```
{
    "riskLevel": 5,
    "risks: [
        "account harvesting",
        "account attack",
        "account testing",
        "account sharing",
        "login velocity"
    ],
    "experimental": {
        "ip_insights"
    }
}
```

FIG. 7A

```
{
    "riskLevel": 5,
    "risks: [
        "account harvesting",
        "account attack",
        "account testing",
        "account sharing",
        "login velocity"
    ],
    "extra": {
        "score": 900,
        "city": "string",
        "state": "string",
        "country": "string",
        "carrier": "string",
        "browser": "string"
    }
}
```

FIG. 7B

```
{
    "riskLevel": 5,
    "risks: [
        "account harvesting",
        "account attack",
        "account testing",
        "account sharing",
        "login velocity"
    ],
    "extra": {
        "city": "string",
        "state": "string",
        "country": "string",
        "carrier": "string"
    }
}
```

FIG. 7C

```
{
    "riskLevel": 5,
    "risks: [
        "account harvesting",
        "account attack",
        "account testing",
        "account sharing",
        "login velocity"
    ],
    "extra": {
        "city": "string",
        "country": "canada"
    }
}
```

FIG. 7D

```
{
    "riskLevel": 5,
    "risks: [
        "account harvesting",
        "account attack",
        "account testing",
        "account sharing",
        "login velocity"
    ],
    "extra": {
        "score": 900,
        "city": "string",
        "state": "string",
        "country": "string",
        "carrier": "string",
        "browser": "string",
        "ipInsightsScore": "-90",
        "NuDetectId": "w-123456"
    }
    "experimental": {
        "ip_insights"
    }
}
```

FIG. 7E

```
{
    "riskLevel": 5,
    "risks: [
        "account harvesting",
        "account attack",
        "account testing",
        "account sharing",
        "login velocity"
    ],
    "extra": {
        "score": 900,
        "city": "string",
        "state": "string",
        "country": "string",
        "carrier": "string",
        "browser": "string",
        "ipInsightsScore": "-90"
    }
    "experimental": {
        "ip_insights"
    }
}
```

FIG. 7F

```
{
    "riskLevel": 5,
    "risks: [
        "account harvesting",
        "account attack",
        "account testing",
        "account sharing",
        "login velocity"
    ],
    "extra": {
        "NuDetectId": "w-123456"
    }
    "experimental": {
        "ip_insights"
    }
}
```

FIG. 7G

LIGHTWEIGHT CONFIGURATION MANAGEMENT FOR APPLICATION PROGRAMMING INTERFACES

FIELD

Embodiments described herein relate to lightweight configuration management for application programming interfaces ("APIs").

BACKGROUND

Traditional configuration management systems leverage either a centralized configuration database (for example, MySQL), a specially formatted local file (for example, an ini file, a yaml file, a j son file, or the like), or a side car container running specialized configuration management software. However, each of these solutions incurs a penalty to the performance, cost, and complexity of the API solution. Accordingly, there is a need to circumvent these issues.

SUMMARY

The embodiments described herein provide methods and systems for providing configuration management using customized request headers. In particular, the embodiments described herein provide for generating customized requests having customized request headers and generating customized responses having customized response bodies based on the customized request headers. The embodiments described herein leverage HTTP request headers to customize behavior of an API solution on a per request basis, which bypasses the complexity and performance cost of implementing traditional configuration management systems for enterprise customers. Additionally, the embodiments described herein decreases the overall required storage and response time latency for the API solution. Accordingly, the embodiments described herein solve the complex issue of configuration management by leveraging HTTP request headers to provide configuration flags that would be otherwise unsustainable in configurations provided through API paths (URLs) or slow and complex configuration databases while maintaining the security of the API solution.

One embodiment provides a system for providing configuration management using customized request headers. The system includes an electronic processor configured to receive, from a requesting device, a request including a customized request header, the customized request header including a custom configuration parameter. The electronic processor is also configured to perform a fraud analysis function based on the request. The electronic processor is also configured to generate a response including a customized response body based on the customized request header. The electronic processor is also configured to transmit the response to the requesting device, wherein the requesting device performs functionality based on information included in the customized response body.

Another embodiment provides a method for providing configuration management using customized request headers. The method includes receiving, from a requesting device, a request including a customized request header, the customized request header including a custom configuration parameter. The method also includes performing, with an electronic processor, a fraud analysis function based on the request. The method also includes generating, with the electronic processor, a response including a customized response body based on the customized request header. The method also includes transmitting, with the electronic processor, the response to the requesting device, wherein the requesting device performs functionality based on information included in the customized response body.

Yet another embodiment provides a non-transitory, computer-readable medium storing instructions that, when executed by an electronic processor, perform a set of functions. The set of functions includes receiving, from a requesting device, a request including a customized request header, the customized request header including a custom configuration parameter. The set of functions also includes performing a fraud analysis function based on the custom configuration parameter. The set of functions also includes generating a response including a customized response body based on the customized request header. The set of functions also includes transmitting the response to the requesting device, wherein the requesting device performs functionality based on information included in the customized response body.

Other aspects of the embodiments described herein will become apparent by consideration of the detailed description and accompanying drawings.

BRIEF DESCRIPTION OF THE DRAWINGS

FIG. 6A illustrates an example request according to some embodiments.

FIG. 6B illustrates an example default response to the request of FIG. 6A according to some embodiments.

FIGS. 7A-7G illustrates example responses having custom response bodies according to some embodiments.

Other aspects of the embodiments described herein will become apparent by consideration of the detailed description.

DETAILED DESCRIPTION OF THE EMBODIMENTS

Figure 1:
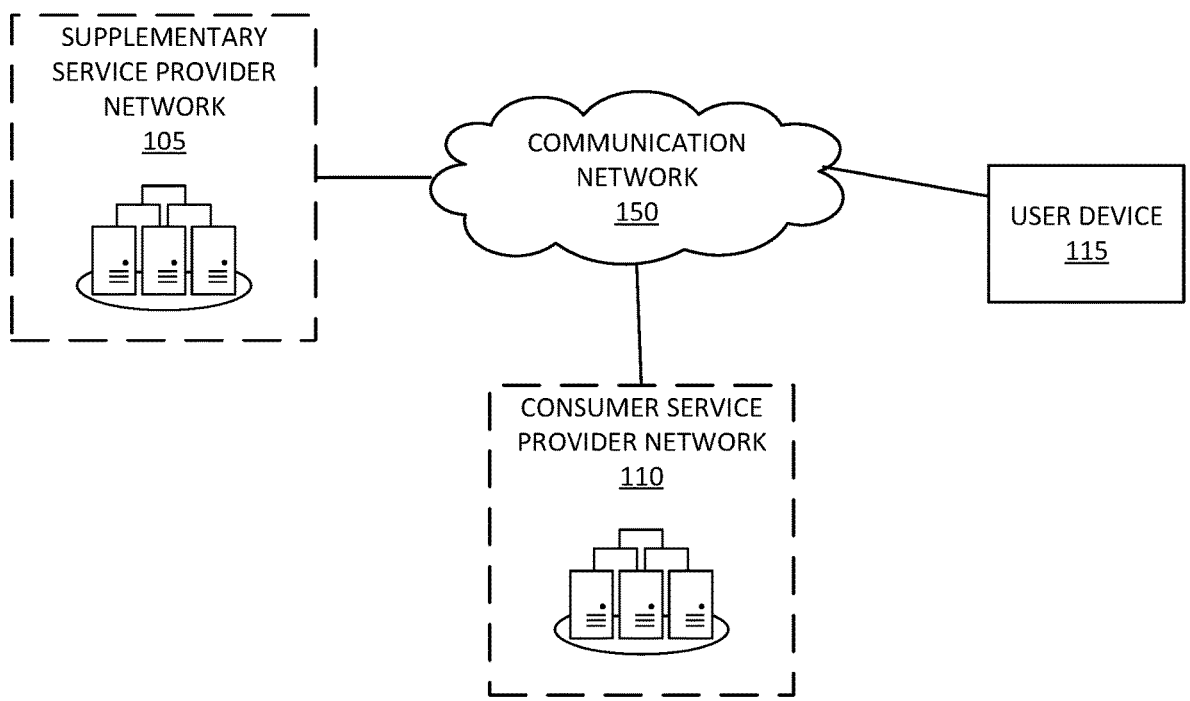
FIG. 1 is a block diagram of a system for providing configuration management using customized request headers according to some embodiments.

FIG. 1 is a block diagram of a system 100 for providing configuration management using customized request headers according to some embodiments. In the example shown, the system 100 includes a supplementary service provider network 105, a consumer service provider network 110, and a user device 115. In some embodiments, the system 100 includes fewer, additional, or different components than illustrated in FIG. 1. Also, in some embodiments, one or more of the components of the system 100 may be distributed among multiple servers, databases, or devices, combined within a single server, database, or device, or a combination thereof.

The supplementary service provider network 105, the consumer service provider network 110, and the user device 115 communicate over one or more wired or wireless communication networks 150. Portions of the communication networks 150 may be implemented using a wide area network ("WAN"), such as the Internet, a local area network ("LAN"), such as a Bluetooth™ network or Wi-Fi, and combinations or derivatives thereof. Alternatively or in addition, in some embodiments, the components of the system 100 communicate through one or more intermediary devices not illustrated in FIG. 1. Also, in some embodiments, components of the system 100 (or a portion thereof) communicate directly through the communication network 150.

The consumer service provider network 110 provides a service, such as a cloud-service, to an end-user (for example, a consumer), such as a media streaming service, a productivity service, a gaming service, an e-commerce service, and the like. In some embodiments, the consumer service provider network 110 includes one or more computing devices, servers, databases, or a combination thereof.

Figure 2:
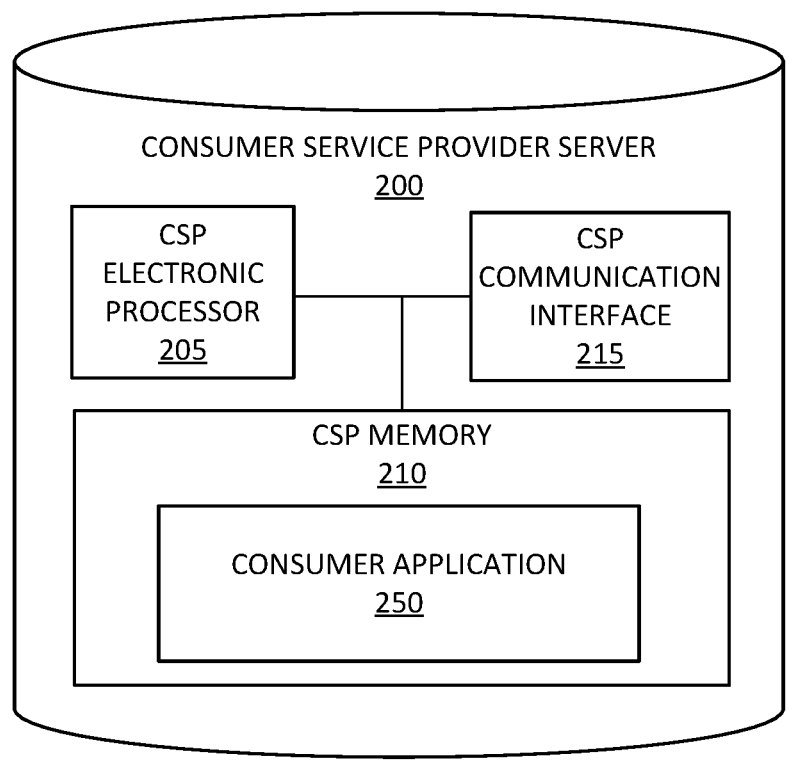
FIG. 2 is a block diagram of a consumer service provider server of the system of FIG. 1 according to some embodiments.

As one example, FIG. 2 illustrates a consumer service provider server 200 ("the CSP server 200") included in the consumer service provider network 110. As illustrated in FIG. 2, the CSP server 200 includes an CSP electronic processor 205 (for example, a microprocessor, an application-specific integrated circuit ("ASIC"), or another suitable electronic device), a CSP memory 210 (for example, a non-transitory, computer-readable medium), and a CSP communication interface 215. The CSP electronic processor 205, the CSP memory 210, and the CSP communication interface 215 communicate wirelessly, over one or more communication lines or buses, or a combination thereof. It should be understood that the CSP server 200 may include additional, different, or fewer components than those illustrated in FIG. 2 in various configurations and may perform additional functionality than the functionality described herein. For example, in some embodiments, the functionality (or a portion thereof) described herein as being performed by the CSP server 200 may be distributed among multiple servers or devices (including as part of a cloud-based service). In particular, as noted above, in some embodiments, the consumer service provider network 110 includes one or more computing devices, servers, databases, or a combination thereof, as noted above.

The CSP communication interface 215 allows the CSP server 200 to communicate with devices external to the CSP server 200. For example, as illustrated in FIG. 1, the CSP server 200 (for example, the consumer service provider network 110) may communicate with the supplementary service provider network 105 (or one or more components thereof), the user device 115, or a combination thereof through the CSP communication interface 215. The CSP communication interface 215 may include a port for receiving a wired connection to an external device (for example, a universal serial bus ("USB") cable and the like), a transceiver for establishing a wireless connection to an external device (for example, over one or more communication networks 150), or a combination thereof.

The CSP electronic processor 205 is configured to access and execute computer-readable instructions ("software") stored in the CSP memory 210. The software may include firmware, one or more applications, program data, filters, rules, one or more program modules, and other executable instructions. For example, the software may include instructions and associated data for performing a set of functions, including the methods described herein. For example, as illustrated in FIG. 2, the CSP memory 210 stores a consumer application 250 ("the application 250"). The application 250 is a software application executable by the CSP electronic processor 205. As described in more detail below, the application 250, when executed by the CSP electronic processor 205, provides a service, such as a cloud-service, to an end-user, such as a media streaming service, a productivity service, a gaming service, an e-commerce service, an online banking service, and the like. Alternatively or in addition, as described in greater detail below, in some embodiments, the CSP electronic processor 205 (for example, as part of executing the application 250) generates a request including a customized request header, such as a custom HTTP request header (for example, a customized request). In some embodiments, the CSP electronic processor 205 generates the customized request based on an end-user request received from, for example, the user device 115.

The supplementary service provider network 105 provides a supplementary service leveraged (or used) by another service provider, such as a consumer service provider (for example, the CSP server 200, another component of the consumer service provider network 110, or a combination thereof). In some embodiments, the supplementary service provider network 105 (or one or more components thereof) provides a fraud analysis and monitoring service usable by another service provider. As one example, a consumer service provider (i.e., the consumer service provider network 110) may leverage a fraud analysis service offered by the supplementary service provider network 105 to identify trusted devices logging into a media steaming service (for example, the application 250) provided by the consumer service provider network 110. In some embodiments, the supplementary service provider network 105 includes one or more computing devices, servers, databases, or a combination thereof.

Figure 3:
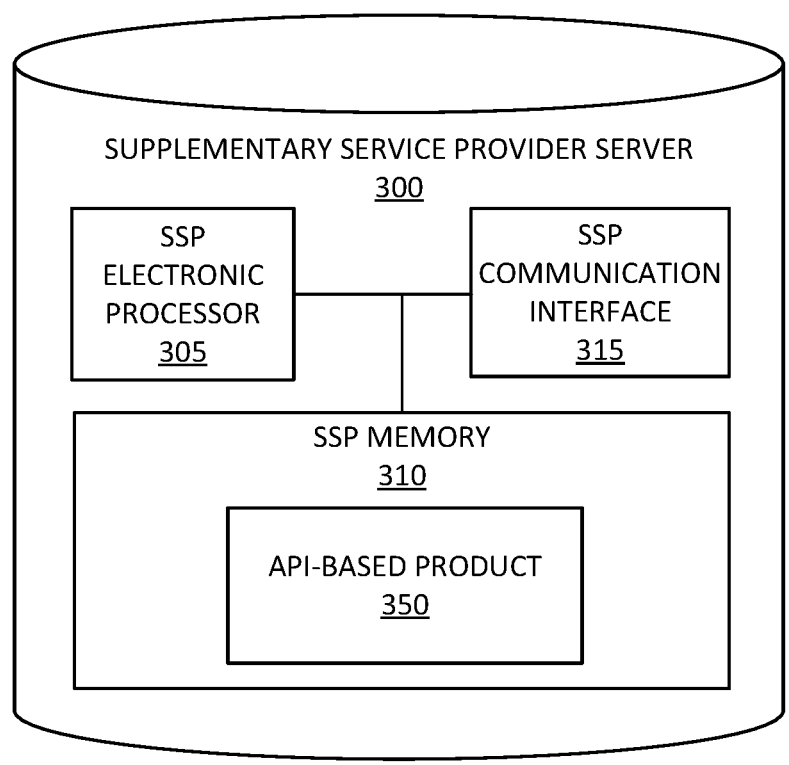
FIG. 3 is a block diagram of a supplementary service provider server of the system of FIG. 1 according to some embodiments.

As one example, FIG. 3 illustrates a supplementary service provider server 300 ("the SSP server 300") included in the supplementary service provider network 105. As illustrated in FIG. 3, the SSP server 300 includes an SSP electronic processor 305 (for example, a microprocessor, an application-specific integrated circuit ("ASIC"), or another suitable electronic device), an SSP memory 310 (for example, a non-transitory, computer-readable medium), and an SSP communication interface 315. The SSP electronic processor 305, the SSP memory 310, and the SSP communication interface 315 communicate wirelessly, over one or more communication lines or buses, or a combination thereof. It should be understood that the SSP server 300 may include additional, different, or fewer components than those illustrated in FIG. 3 in various configurations and may perform additional functionality than the functionality described herein. For example, in some embodiments, the functionality (or a portion thereof) described herein as being performed by the SSP server 300 may be distributed among multiple servers or devices (including as part of a cloud-based service). In particular, in some embodiments, the supplementary service provider network 105 includes one or more computing devices, servers, databases, or a combination thereof, as noted above.

The SSP communication interface 315 allows the SSP server 300 to communicate with devices external to the SSP server 300. For example, as illustrated in FIG. 1, the SSP server 300 (for example, the supplementary service provider network 105) may communicate with the consumer service provider network 110 (or one or more components included therein), the user device 115, or a combination thereof through the SSP communication interface 315. The SSP communication interface 315 may include a port for receiving a wired connection to an external device (for example, a universal serial bus ("USB") cable and the like), a transceiver for establishing a wireless connection to an external device (for example, over one or more communication networks 150), or a combination thereof.

The SSP electronic processor 305 is configured to access and execute computer-readable instructions ("software") stored in the SSP memory 310. The software may include firmware, one or more applications, program data, filters, rules, one or more program modules, and other executable instructions. For example, the software may include instructions and associated data for performing a set of functions, including the methods described herein. For example, as illustrated in FIG. 3, the SSP memory 310 stores an API-based product 350 (for example, a supplementary service). The API-based product 350 is a software application executable by the SSP electronic processor 305. In some embodiments, the API-based product 350, when executed by the SSP electronic processor 305, performs one or more security or anti-fraud functions, such as fraud detection, fraud monitoring, and the like. For example, an API-based product 350 may be an account takeover prevention application, a fraudulent account creation prevention application, a trusted device identification application, and the like. As described in more detail below, in some embodiments, the SSP electronic processor 305 may execute the API-based product 350 based on a request having a customized request header. For example, in some embodiments, the API-based product 350 may generate and transmit a response having a customized response body based on the customized request header of the received request, as described in greater detail below.

The user device 115 may include one or more desktop computers, laptop computers, tablet computers, terminals, smart telephones, smart televisions, smart wearables, servers, databases, other types of computing devices, or a combination thereof. A user (for example, an end user, a customer, a consumer, a group of users, an organization, another user entity, or the like) may interact with the user device 115 to access a consumer service provided by the consumer service provider network 110 (for example, the application 250 provided by the CSP server 200). For example, when the consumer service is a media streaming service, a user of the user device 115 may use the user device 115 to log-in to a user account associated with the user and, after successfully logging in, stream a video using the media streaming service. Although not illustrated in FIG. 1, the user device 115 may include similar components as the CSP server 200, the SSP server 300, or a combination thereof, such as an electronic processor, a memory, and a communication interface. The user device 115 may also include one or more input devices (keyboard, keypad, mouse, joystick, touchscreen, and the like) and one or more output devices (display device, touchscreen, printer, speaker, and the like) that receive input from a user and provide output to a user.

Figure 4:
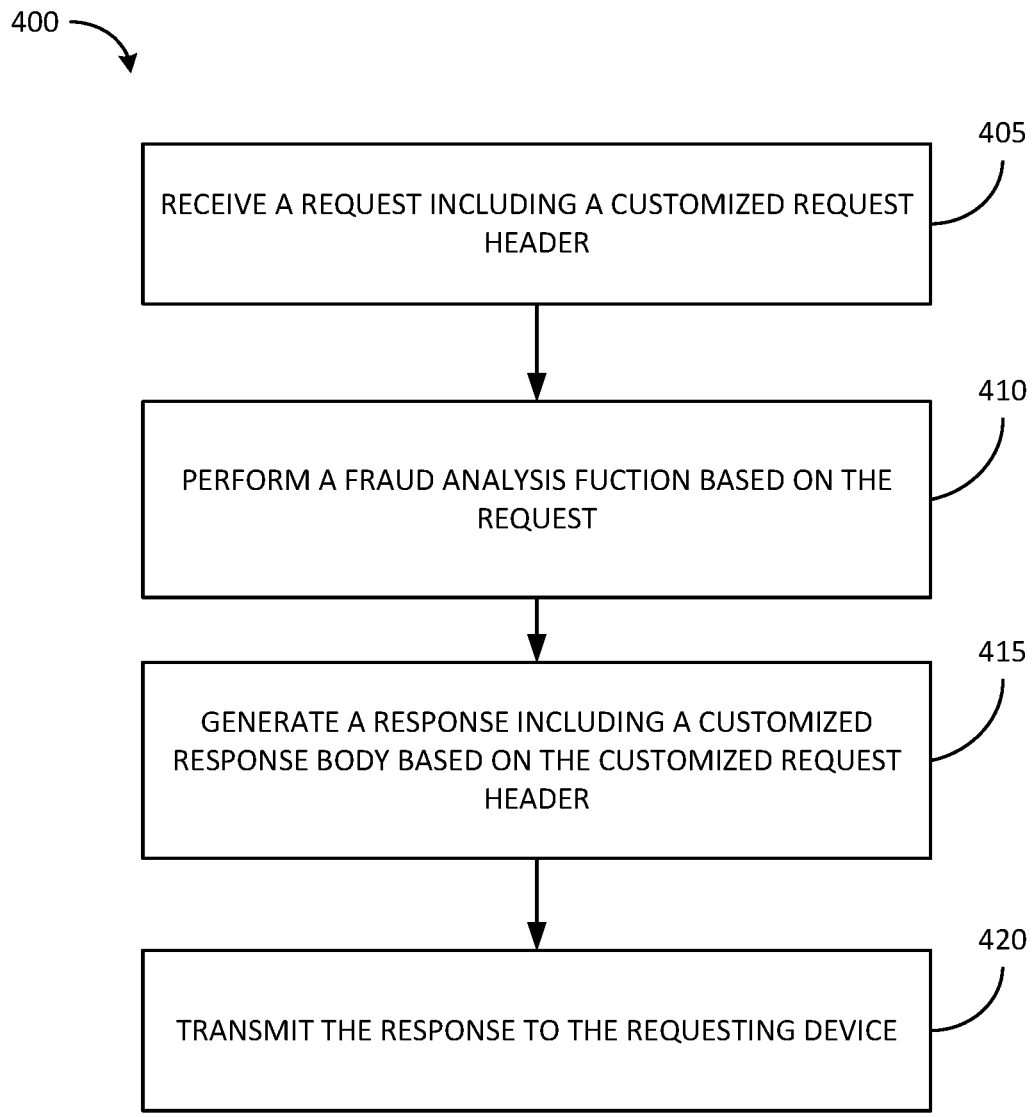
FIG. 4 is a flowchart of a method for providing configuration management using customized request headers using the system of FIG. 1 according to some embodiments.

FIG. 4 is a flowchart illustrating a method 400 for providing configuration management using customized request headers according to some embodiments. The method 400 is described with reference to FIG. 5, which illustrates an example communication flow between components of the system 100 of FIG. 1. The method 400 is described as being performed by the SSP server 300. However, as noted above, the functionality performed by the SSP server 300 (or a portion thereof) may be performed by other devices (via an electronic processor executing instructions), including, for example, one or more components of the consumer service provider network 110 (for example, the CSP server 200), the user device 115, or a combination thereof.

As seen in FIG. 4, the method 400 includes receiving a request including a customized request header (at block 405). In some embodiments, the SSP electronic processor 305 receives the request from a requesting device, such as a component of the consumer service provider network 110 (for example, the CSP server 200). In some embodiments, the customized request header includes a custom configuration parameter that is used as part of a configuration management process, as described in greater detail below.

Figure 5:
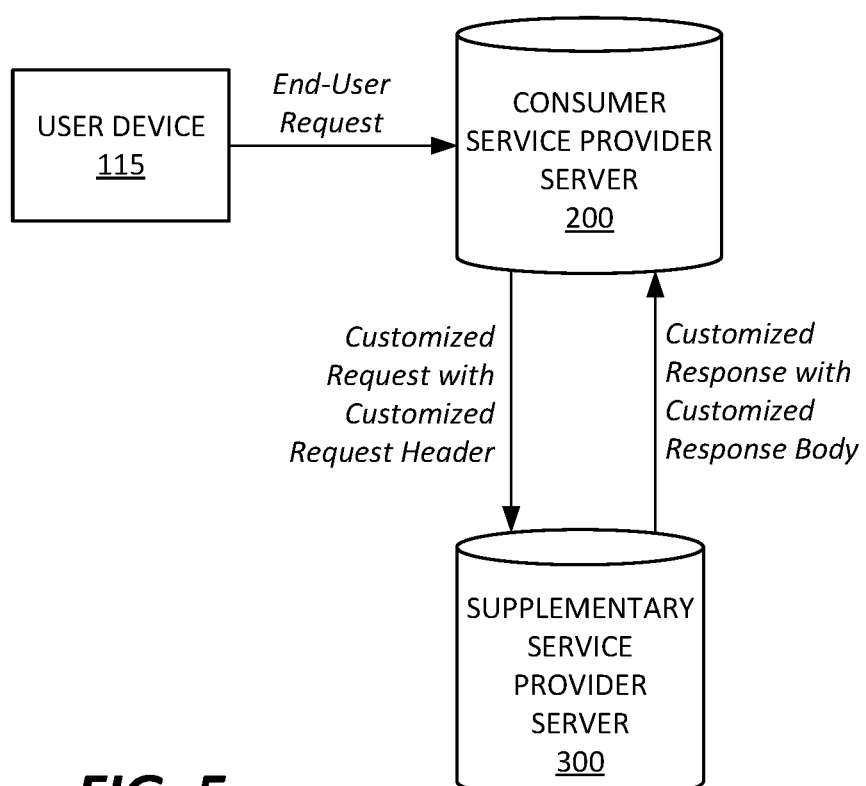
FIG. 5 schematically illustrates an example communication flow between components of the system of FIG. 1 according to some embodiments.

As noted above, a user may use the user device 115 to access a consumer service provided by the consumer service provider network 110. As one example, when the consumer service is a media streaming service, a user of the user device 115 may use the user device 115 to log-in to a user account associated with the user and, after successfully logging in, stream a video using the media streaming service. Accordingly, in some embodiments, the user device 115 interacts with one or more components of the consumer service provider network 110 (for example, the CSP server 200) through one or more end-user requests, as illustrated in FIG. 5. According to the above example, the user device 115 may issue an end-user request associated with a log-in attempt.

In response to receiving the end-user request, the CSP server 200 (for example, the CSP electronic processor 205) may generate a request with a customized request header (for example, a "customized request"). As one example, the CSP server 200 may generate the customized request as part of an authorization service performed by the CSP server 200. As one example, where the end-user request is associated with a log-in attempt, the CSP server 200 (for example, the CSP electronic processor 205) may generate the customized request and transmit the customized request to the supplementary service provider network 105 (for example, the SSP server 300) to determine whether the end-user request is associated with a trusted device, associated with fraud, or the like.

In some embodiments, the CSP server 200 generates the customized request header based on the end-user request. The CSP server 200 may analyze data associated with the end-user request to determine one or more device characteristics associated with the user device 115. After determining the one or more device characteristics, the CSP server 200 generates a request including the one or more device characteristics. Additionally, in some embodiments, the CSP server 200 also customizes the request header to include one or more custom configuration parameters. As seen in FIG. 5, the CSP server 200 then transmits the customized request to the SSP server 300 (at block 405 of FIG. 4). As described in greater detail below, the configuration parameter(s) will be used by the SSP server 300 when processing the customized request and generating a customized response having a customized response body based on the customized request header.

In response to receiving the custom request, the SSP electronic processor 305 performs a fraud analysis function based on the request (at block 410). As noted above, in some embodiments, the supplementary service provider network 105 (for example, the SSP server 300) provides a fraud analysis and monitoring service (for example, fraud analysis functionality) usable by another service provider, such as the consumer service provider network 110 (for example, the CSP server 200). As noted above, the SSP server 300 provides the API-based product 350. In some embodiments, the API-based product 350, when executed by the SSP electronic processor 305, performs one or more security or anti-fraud functions, such as fraud detection, fraud monitoring, and the like. For example, an API-based product 350 may be an account takeover prevention application, a fraudulent account creation prevention application, a trusted device identification application, and the like. Accordingly, in some embodiments, the API-based product 350 provides the fraud analysis functionality performed by the SSP electronic processor 305 as part of block 410.

In some embodiments, the request includes a custom request header defining an additional configuration parameter or setting. The additional configuration parameter or setting may be associated with the API-based product 350 provided by the SSP server 300. As one example, the additional configuration parameter may be an application runtime behavior parameter, such as turning on debugging information, enabling or disabling pieces of application functionality, and the like. As another example, the additional configuration parameter may include an application version, such as a version of the API-based product 350. Accordingly, in such embodiments, the SSP electronic processor 305 performs the fraud analysis function based on the customized request header (for example, the additional configuration parameter(s) included in the customized request header).

As seen in FIG. 4, the SSP electronic processor 305 generates a response including a customized response body based on the customized request header (at block 415). FIG. 6A illustrates an example request for an account takeover protection API solution or product (for example, the API-based product 350) according to some embodiments. The request illustrated in FIG. 6A is a POST request to an API endpoint (for example, the API-based product 350). FIG. 6B illustrates a default response generated in response to the request of FIG. 6A. As seen in FIG. 6B, in some embodiments, the default response body includes a risk level and a count of risks.

In some embodiments, the customized request header is an "enable-experimental" header. The enable-experimental header allows a consumer service provider to define an accessibility to an experimental function, such as for testing or evaluation purposes. As one example, a consumer service provider may want to enable the enable-experimental header to access an experimental function to determine a performance of the experimental function. Accordingly, the enable-experimental header may be used when, for example, the API-based product 350 has an experimental function (for example, an experimental feature or machine-learning capabilities) that may be enabled on a case-by-case basis. Alternatively or in addition, the enable-experimental header may be used when a new version of a model or fraud analysis function is available. The enable-experimental header may be enabled by setting an enable-experimental value to true, which enables the enable-experimental header, or false, which disables the enable-experimental header. When the enable-experimental header is enabled, the SSP electronic processor 305 generates a response that includes an additional response field in the response body (as a customized response body), such as "experimental" with one or more experimental flags provided. FIG. 7A illustrates an example customized response when the enable-experimental header is enabled. In particular, when the enable-experimental header value is set to "true" in the customized request received by the SSP server 300, the customized response includes a customized response body as illustrated in FIG. 7A.

Alternatively or in addition, in some embodiments, the customized request header is an "enable-extra" header. The enable-extra header allows a consumer service provider to define an amount of information to be included in the customized response body, a type of information to be included in the customized response body, or a combination thereof. As one example, a consumer service provider may want to receive extra detail or information from the supplementary service provider (for example, from the API-based product 350) to perform their own processing or troubleshooting based on the extra detail or information. As noted above, in some embodiments, the customized request header may specify an amount of information to include in the customized response body (for example, the amount or number of fields included in the response body). As one example, the customized request header may increase the amount of information included in the customized response body. As another example, the customized request header may decrease the amount of information included in the customized response body. In some embodiments, the customized request header may specify a type of information to include in the customized response body (for example, what fields to include in the response body). A type of information may include, for example, a city, a state, a country, a carrier, a browser, an IP address, a user agent, or the like associated with the end-user request.

As one example, FIG. 7B illustrates an example customized response when the enable-extra header is enabled. In particular, when the enable-extra header value is set to "ALL" in the customized request received by the SSP server 300, the customized response includes a customized response body as illustrated in FIG. 7B. As seen in FIG. 7B, by setting the enable-extra header value to "ALL," the customized response body includes all possible fields in the customized response field.

As another example, FIG. 7C illustrates another example customized response when the enable-extra header is enabled. In particular, when the enable-extra header value is set to "GEOIP" in the customized request received by the SSP server 300, the customized response includes a customized response body as illustrated in FIG. 7C. As seen in FIG. 7C, by setting the enable-extra header value to "GEOIP," the customized response body includes GEOIP related fields, such as a "city" field, a "state" field, a "country" field, and a "carrier" field.

As yet another example, FIG. 7D illustrates another example customized response when the enable-extra header is enabled. In particular, when the enable-extra header value is set to "CITY, COUNTRY" in the customized request received by the SSP server 300, the customized response includes a customized response body as illustrated in FIG. 7D. As seen in FIG. 7D, by setting the enable-extra header value to "CITY, COUNTRY," the customized response body includes a "city" field and a "country" field.

Alternatively or in addition, in some embodiments, the customized request header is an "config-[KEY]" header. The config-[KEY] header allows a consumer service provider to define one or more configuration parameters or settings (for example, an additional configuration parameter). The additional configuration parameter may be associated with the API-based product 350 provided by the SSP server 300. As one example, the additional configuration parameter may be an application runtime behavior parameter (for example, by injecting custom configuration into the runtime environment of the API-based product 350). As another example, the additional configuration parameter may include an application version, such as a version of the API-based product 350.

Accordingly, as noted above, in some embodiments, the SSP electronic processor 305 performs the fraud analysis function based on the customized request header (for example, the additional configuration parameter(s) included in the customized request header).

Alternatively or in addition, in some embodiments, the config-[KEY] header affects a response body (i.e., a customized response body). When the Config-[KEY] header affects the response body, the affected field may be in an extra object in the response body under a key that matches the provided [KEY]. In some embodiments, the affected field is shown when the enable-extra header is set to "ALL" or the [KEY] is in the enable-extra header response list. As one example, FIG. 7E illustrates an example customized response. In particular, when the enable-experimental header is set to "True," the enable-extra header is set to "ALL," and the config-[KEY] header, where KEY is an application or website ID and the configuration value is set to "w-123456" in the customized request received by the SSP server 300, the customized response includes a customized response body as illustrated in FIG. 7E.

In some embodiments, the customized request header may have more than one header enabled. As one example, FIG. 7F illustrates an example customized response when the enable-experimental header and the enable-extra header are enabled. In particular, when the enable-experimental header value is set to "True" and the enable-extra header value is set to "ALL" in the customized request received by the SSP server 300, the customized response includes a customized response body as illustrated in FIG. 7F. As seen in FIG. 7F, by setting the enable-extra header value to "ALL," the customized response body includes all possible fields in the customized response field. Additionally, by setting the enable-experimental header value to "True," the customized response body includes an "experimental" field with one or more experimental flags provided (for example, illustrated as "ip_insights"). As another example, FIG. 7G illustrates an example customized response when the enable-experimental header, the enable-extra header, and the config-[KEY] header is enabled. In particular, when the enable-experimental header value is set to "True," the enable-extra header value is set to "ApplicationID," and the configuration value for the config-[KEY] is set to "w-123456," where the KEY is "Application ID," in the customized request received by the SSP server 300, the customized response includes a customized response body as illustrated in FIG. 7G.

After generating the customized response, the SSP electronic processor 305 transmits the customized response to the requesting device, such as the CSP server 200 (at block 420). In some embodiments, the requesting device (for example, the CSP server 200) performs functionality based on information included in the customized response body. As one example, when the initial end-user request was a log-in attempt, the requesting device may process the information included in the response body and determine whether the log-in attempt is associated with fraud and, ultimately, whether to grant or deny the log-in attempt. As another example, the requesting device may perform additional processing or troubleshooting based on the information included in the response body. As yet another example, the requesting device may log the information included in the response body for tracking or monitoring.

Thus, the embodiments described herein provide, among other things, methods and systems for providing configuration management using customized request headers. Various features and advantages of the embodiments are set forth in the following claims.

It is to be understood that the embodiments are not limited in its application to the details of construction and the arrangement of components set forth in the following description or illustrated in the accompanying drawings. The embodiments are capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

What is claimed is:

1. A system for providing configuration management using customized request headers, the system comprising:
   an electronic processor configured to
      receive, from a requesting device, a request including a customized request header, the customized request header including a custom configuration parameter, perform a fraud analysis function based on the request,
generate a response including a customized response body based on the customized request header, wherein the customized response body includes a set of fields selected from all possible fields that are requested based on a number of fields, defined by the customized request header, to be included in the customized response body, and
transmit the response to the requesting device, wherein the requesting device performs functionality based on information included in the customized response body.

2. The system of claim 1, wherein the request is a post request.

3. The system of claim 1, wherein the fraud analysis function is performed based on the custom configuration parameter.

4. The system of claim 1, wherein the customized request header defines an additional configuration parameter.

5. The system of claim 4, wherein the additional configuration parameter includes an application runtime behavior parameter.

6. The system of claim 4, wherein the additional configuration parameter includes an application version.

7. The system of claim 1, wherein the customized request header defines an accessibility to an experimental function for testing.

8. The system of claim 1, wherein the customized request header defines an amount of information to be included in the customized response body.

9. The system of claim 8, wherein the customized request header further defines a type of information to be included in the customized response body.

10. The system of claim 9, wherein the type of information includes at least one selected from a group consisting of a city, a state, a country, a carrier, a browser, an IP address, and a user agent.

11. A method for providing configuration management using customized request headers, the method comprising:
receiving, from a requesting device, a request including a customized request header, the customized request header including a custom configuration parameter;
performing, with an electronic processor, a fraud analysis function based on the request;
generating, with the electronic processor, a response including a customized response body based on the customized request header, wherein the customized response body includes a set of fields selected from all possible fields that are requested based on a number of fields, defined by the customized request header, to be included in the customized response body; and
transmitting, with the electronic processor, the response to the requesting device, wherein the requesting device performs functionality based on information included in the customized response body.

12. The method of claim 11, wherein performing the fraud analysis function includes performing the fraud analysis function based on the custom configuration parameter.

13. The method of claim 11, wherein receiving the request includes receiving a request including a customized request header defining an additional configuration parameter.

14. The method of claim 11, wherein receiving the request includes receiving a request including a customized request header defining an accessibility to an experimental function for testing.

15. The method of claim 11, wherein receiving the request includes receiving a request including a customized request header defining an amount of information to be included in the customized response body.

16. The method of claim 11, wherein receiving the request includes receiving a request including a customized request header defining a type of information to be included in the customized response body.

17. A non-transitory, computer-readable medium storing instructions that, when executed by an electronic processor, perform a set of functions, the set of functions comprising:
receiving, from a requesting device, a request including a customized request header, the customized request header including a custom configuration parameter;
performing a fraud analysis function based on the custom configuration parameter;
generating a response including a customized response body based on the customized request header, wherein the customized response body includes a set of fields selected from all possible fields that are requested based on a number of fields, defined by the customized request header, to be included in the customized response body; and
transmitting the response to the requesting device, wherein the requesting device performs functionality based on information included in the customized response body.

18. The computer-readable medium of claim 17, wherein receiving the request includes receiving a request including a customized request header defining an accessibility to an experimental function for testing.

19. The computer-readable medium of claim 17, wherein receiving the request includes receiving a request including a customized request header defining an amount of information to be included in the customized response body and a type of information to be included in the customized response body.

20. The computer-readable medium of claim 17, wherein receiving the request includes receiving a request including a customized request header defining an additional configuration parameter.

* * * * *